(No Model.)
L. BOCK, Jr.
TELEGRAPHY.
No. 364,471. Patented June 7, 1887.
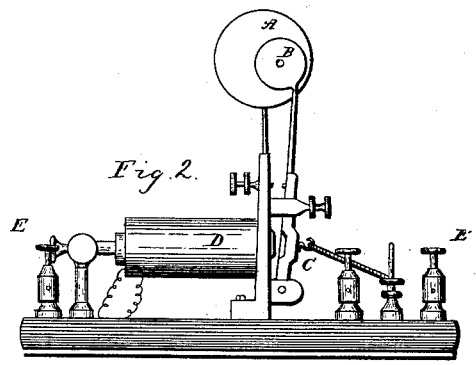
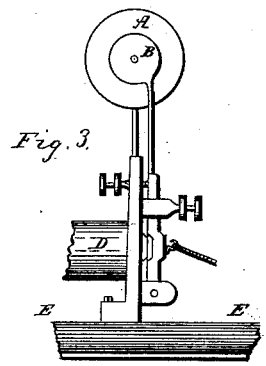
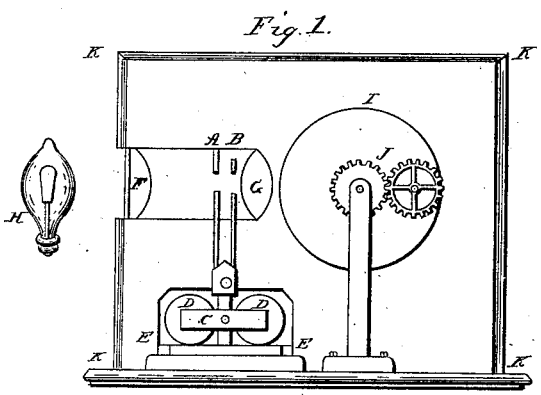
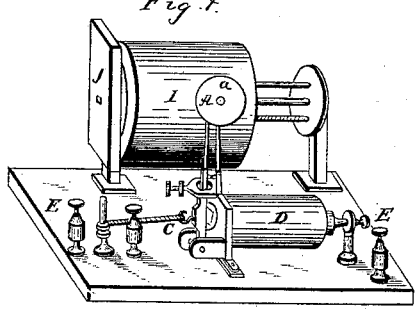
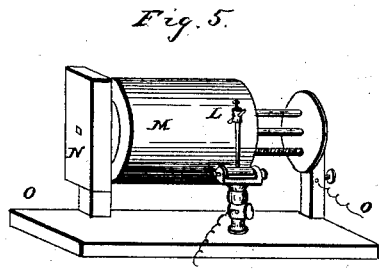
WITNESSES
Edwin L. Bradford
George Oliver
INVENTOR
Leo Bock jr.
By Alfred Shedlock
Attorney

UNITED STATES PATENT OFFICE.

LEO BOCK, JR., OF NEW YORK, N. Y.

TELEGRAPHY.

SPECIFICATION forming part of Letters Patent No. 364,471, dated June 7, 1887.

Application filed December 11, 1885. Serial No. 185,364. (No model.)

*To all whom it may concern:*

Be it known that I, LEO BOCK, Jr., a subject of the Emperor of Germany, but a resident of the city of New York, in the county and State of New York, United States of America, have invented certain new and useful Improvements in Electrical Communication, to be known as the "Bock Photographic Automatic Telegraph;" and I do hereby declare that the following is a full and clear description of the same.

This invention has for its object to facilitate electrical communication and increase the capacity of telegraphic systems, and relates to a new method and means for electrically transmitting records produced by electrical or mechanical impulses or vibrations, embracing a circuit-controller composed of gelatine or other organic matter combined with certain chemical agents whereby it is made sensitive to the action of light, such gelatine being generally known as "photographically-treated gelatine," by which name it will be hereafter designated in this specification and claims.

The production of a permanent record is accomplished by causing light to impinge on a sensitized plate, film, or paper in an intermittent or variable manner by means of a light-controlling device, as a shutter or reflector actuated by an electro-magnetic instrument when electricity is the medium of transmission, or by mechanical means when the medium of transmission is other than electrical. The sensitized film, plate, or paper is uniformly moved by clock-work or other suitable means when the light-rays are acting thereon.

I am aware that it is old to employ sensitized surfaces and light-controlling devices to receive telegraphic messages and as record-receivers in philosophical instruments; but my use of such differs from previous applications in that the sensitized receiver is made transparent to adapt it to be used as a negative record from which the circuit-controller, consisting of photographically-treated gelatine, may be prepared. This sensitive gelatine plate is exposed to light-rays under the negative produced in the receiving-instrument, and then treated to remove the parts thereof unaffected by the light in a manner well understood. It is then placed in a transmitting-instrument having a metallic bed actuated by clock-work or other motive power, and a contact device, point, or stylus located opposite the bed, which comes in contact with the bed as the removed parts of the plate or film representing the message or record pass under it, thus completing at such times an electric circuit in which the bed and stylus are included. These positive plates or films may be backed by thin sheets of metal or other conducting material, and the compound plates so prepared placed in the circuit of the transmitting-instrument. It is possible to use the photographic record of the electrical or other impulses acting on the receiving-instrument for transmitting, thus avoiding the necessity of preparing a positive therefrom, by making the sensitized plate, film, or paper sufficiently conductive to allow the current to pass through it from the stylus to the metal backing in the transmitting-instrument. This process is embodied and fully described in another application filed December 4, 1886, under Serial No. 220,697; but for many purposes it is better to use a gelatinous or other organic film, which is made insoluble by the action of light on the chemical agents mixed therewith in the transmitter, preparing the same as a positive from the negative produced in the receiving-instrument, because such gelatinous sensitized films require some time to be properly affected by the light, and to enable the messages to be quickly registered it is necessary to use therein a receptive medium prepared with chemicals exceedingly sensitive to the actinic rays of light — as the salts of silver, ordinarily used in photography — the film or plate being made of a transparent material, preferably gelatine, collodion, or transparent paper, as such material can be bent or formed into any desired shape.

The intermittent or variable electric current caused to flow by reason of the photographically prepared plate or film moving under the contact-stylus of the transmitter actuates a suitable receiver or recording-instrument at the receiving end of the line, adapted to reproduce or make manifest the initial impulses or vibratory motions which were originally recorded, or indications corresponding thereto.

The accompanying drawings, to which I will now refer, illustrate a set of instruments adapted to carry out my improved method of electrical communication, and I would here state that any equivalent thereof could as well be used, as my invention does not call for particular or special features of construction in the instruments.

Figure 1 is a sectional view of the receiving and recording instruments. Fig. 2 is an elevation of the light-controlling device, showing it in position to cut off the light, and its electro-magnetic actuating-instrument. Fig 3 is a view similar to Fig. 2, showing the light-controlling device in position to afford a passage for the light. Fig. 4 is a perspective view of a helically-moving drum covered with the sensitized film or paper, and the light-controlling device and its actuating electro-magnet. Fig. 5 is a view of the transmitting-instrument provided with the positive transmitting medium photographically prepared from the negative produced in the receiving-instrument.

The record-receiving medium consists of a film or sheet made sensitive to the actinic rays of light by means of suitable chemicals—as the salts of silver—in the well-known manner, said film or sheet being transparent or subsequently made transparent. The sensitized film or sheet is attached to the cylinder I, so as to fully surround the same and be readily removable therefrom. The cylinder I is then placed in or covered by the dark box K, care being taken, as in all photographic apparatus, to exclude all light from the film or sheet while it is in a sensitized condition. This box K has an opening in one side, in front of which is the disk or diaphragm A, and immediately in front of this disk A is located another disk, B, carried by the armature C of the telegraphic instrument E, the electro-magnet D of which is energized by the current passing over the line in which it is included. The disks A and B have small apertures which are coincident only when the magnet D attracts the armature C.

H represents a light placed in front of the disk B, and F and G are lenses fixed in the opening of the box K to concentrate the light-rays upon the sensitized covering of the cylinder I, as shown at Fig. 1. This cylinder I is mounted on a horizontal shaft which is slowly rotated by the clock-movement $j$, Fig. 4, and is caused to travel longitudinally along the shaft by means of a screw, so that the light-rays affect the sensitized covering in a spiral path.

When the electro-magnet D is in normal condition, the disk B is drawn over by the retractile spring acting on the armature C, and covers the aperture in the disk A, as shown at Fig. 2, all light being then cut off from the interior of the box J, Fig. 1. With each electrical impulse passing over the line in which the magnet D is included, whether such impulse be caused by means of a key or other circuit-closer or current-controller, the armature C is attracted to the magnet D, as shown at Fig. 3, and a ray of light allowed to pass through the disks and act on the sensitized covering of the cylinder I, which, by reason of its continuous and uniform motion, causes the light to affect the sensitized covering in a manner corresponding to the characteristics of the electric impulses. The signs or signal-indications are now brought out clearly in the transparent film by the ordinary photographic-developing process, and a permanent transparent negative of the record produced, which may be preserved for future use and reference.

To automatically retransmit the record, an instrument, O—such as shown at Fig. 5—may be used, which consists of a metal drum, M, on a horizontal shaft, which, by the clock-movement N, is caused to uniformly rotate and carry the cylinder M around with it, the cylinder at the same time being moved longitudinally on the shaft by means of a screw and a stylus, L, whose point is caused to bear on the cylinder with a yielding pressure. The stylus L and cylinder M are included in the circuit over which the record is to be transmitted by the line-wire joining the support of the stylus and the frame, which supports and is in metallic contact with the cylinder M. This circuit also includes a suitable receiving-instrument at the receiving end of the line and a battery, as in ordinary telegraphy. The cylinder M has applied to it the positive plate or film prepared from the negative produced on the cylinder I of the recording-instrument.

The most convenient and simple manner of preparing these positive plates or films at present known to me is by mixing with a solution of gelatine, glue, isinglass, or other suitable organic matter, a dichromate salt, and allowing the plates or films formed therefrom to dry, care being taken to avoid exposing them to the action of light until they are placed under the negative. No special apparatus is required in this part of the process, the operation being in all respects similar to photographic printing—that is, the transparent negative is placed over the photographically-treated gelatine, and the light, upon exposure thereto, passes through the transparent parts of the negative and acts on the gelatine plate. The action of the dichromate salts, when mixed with organic matter and exposed to light-rays, is to make a substance insoluble in water, so that upon carefully soaking and washing in water a film so prepared, after exposure under the negative, which admits the light-rays to the film on all parts, except where covered by the record on the negative, the body of the film will remain intact and the parts representing the record will be removed, thus forming a series of openings through the film corresponding to the impulses or vibrations which actuated the light-controlling device in the receiving-instrument. A film or plate of organic matter hardened or fixed by the above process offers great resistance to the passage of an electric current. Now, when this film or plate is attached to the cylinder M, with the stylus L bearing on it, and the cylinder is caused to move, as aforesaid, it is evident that contact will occur between the stylus and the cylinder, and the current thereby caused to flow over the line when these openings, representing the record, pass under the stylus, and a receiving-instrument at the other end of the line will be thereby affected in exact accordance with the original impulses or vibrations caused to act on the recording-instrument. It is evident that by these means the electrical transmission of messages, signs, or records will be greatly facilitated, the attendance required for such work being vastly reduced, all that is necessary to keep the instrument in operation being to supply the recording-instruments with the sensitized transparent film, plate, or paper, to prepare the positive transmitting plates or films therefrom, and to place said films in the transmitting-instrument. The retransmission of messages, &c., may be done immediately, as but little time is required to prepare the positive plates, or done at any future time, the negatives, when once prepared and fixed, being permanent records, from which the retransmitting plates or films may be prepared at any time.

If it is desired to retransmit over several lines, then the required number of positive plates or films can be prepared from the one negative and applied to the automatic transmitting-instruments included in the lines.

Having now described the nature of my said invention and the manner in which it may be practically applied, what I claim, and desire to secure by Letters Patent, is—

1. The improved method of producing a circuit-controlling plate or film for use in electrical retransmission of impulses or vibrations, which consists in photographically recording the original impulses or vibrations and then photographically producing perforations in the plate corresponding to the recorded impulses or vibrations.

2. In an electrical communicating system, a circuit-controller composed of a plate or film of photographically-treated gelatine having perforations corresponding to the message to be transmitted, substantially as described.

LEO BOCK, Jr.

In presence of—
CHAS. J. PHINNEY,
WILLIAM G. VER PLANCK.